United States Patent
Phelan et al.

(10) Patent No.: US 10,055,254 B2
(45) Date of Patent: Aug. 21, 2018

(54) ACCELERATED DATA OPERATIONS IN VIRTUAL ENVIRONMENTS

(71) Applicant: Bluedata Software, Inc., Mountain View, CA (US)

(72) Inventors: Thomas A. Phelan, San Francisco, CA (US); Michael Moretti, Saratoga, CA (US); Dragan Stancevic, Sunnyvale, CA (US)

(73) Assignee: Bluedata Software, Inc., Santa Clara, CA (US)

( * ) Notice: Subject to any disclaimer, the term of this patent is extended or adjusted under 35 U.S.C. 154(b) by 350 days.

(21) Appl. No.: 14/330,928

(22) Filed: Jul. 14, 2014

(65) Prior Publication Data

US 2015/0020070 A1 Jan. 15, 2015

Related U.S. Application Data

(60) Provisional application No. 61/845,479, filed on Jul. 12, 2013.

(51) Int. Cl.
*G06F 9/50* (2006.01)
*G06F 9/455* (2018.01)

(52) U.S. Cl.
CPC ........ *G06F 9/5016* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,181,180 B1 * | 5/2012 | Anderson | G06F 9/52 714/38.1 |
| 2002/0091863 A1 | 7/2002 | Schug | |
| 2003/0110205 A1 * | 6/2003 | Johnson | G06F 9/5016 718/104 |
| 2010/0138829 A1 | 6/2010 | Hanquez et al. | |
| 2012/0072906 A1 | 3/2012 | Tsirkin et al. | |
| 2012/0304171 A1 * | 11/2012 | Joshi | G06F 9/45558 718/1 |
| 2013/0047157 A1 | 2/2013 | Suzuki | |
| 2013/0055259 A1 * | 2/2013 | Dong | G06F 13/102 718/1 |
| 2013/0290957 A1 * | 10/2013 | Li | G06F 9/5066 718/1 |

FOREIGN PATENT DOCUMENTS

WO WO 2011075870 A1 * 6/2011 ........... G06F 13/102

OTHER PUBLICATIONS

Non Final Office Action received for U.S. Appl. No. 14/330,947, dated Sep. 23, 2015, 14 pages.

* cited by examiner

*Primary Examiner* — Wynuel Aquino

(57) ABSTRACT

Systems, methods, and software described herein facilitate accelerated input and output operations with respect to virtualized environments. In an implementation, upon being notified of a guest read process initiated by a guest element running in a virtual machine to read data into a location in guest memory associated with the guest element, a computing system identifies a location in host memory associated with the location in the guest memory and initiates a host read process to read the data into the location in the host memory that corresponds to the location in the guest memory.

11 Claims, 4 Drawing Sheets

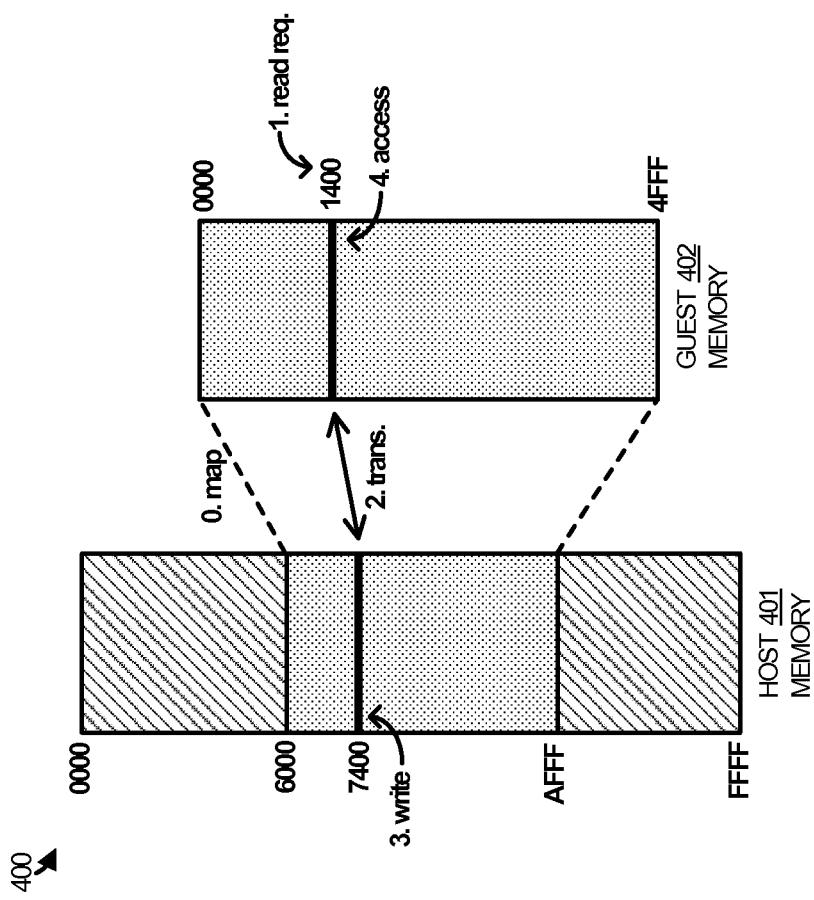

ACCELERATED DATA OPERATIONS IN VIRTUAL ENVIRONMENTS

RELATED APPLICATIONS

This application is related to and claims priority to U.S. Provisional Patent Application No. 61/845,479, entitled "ACCELERATED DATA OPERATIONS IN VIRTUAL ENVRONMENTS," filed on Jul. 12, 2013, and which is hereby incorporated by reference in its entirety.

TECHNICAL FIELD

Aspects of the disclosure are related to computing hardware and software technology, and in particular to accelerated data input and output in virtual environments.

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various applications and frameworks have been developed to interact with such large data sets, including Hive, HBase, Hadoop, Amazon S3, and CloudStore, among others.

At the same time, virtualization techniques have gained popularity and are now common place in data centers and other environments in which it is useful to increase the efficiency with which computing resources are used. In a virtualized environment, one or more virtual machines are instantiated on an underlying computer (or another virtual machine) and share the resources of the underlying computer. However, deploying data-intensive distributed applications across clusters of virtual machines has generally proven impractical due to the latency associated with feeding large data sets to the applications.

OVERVIEW

Provided herein are systems, methods, and software for implementing accelerated data input and output with respect to virtualized environments. Data requested by a guest element running in a virtual machine is delivered to the guest element by way of a region in host memory that is mapped to a region in guest memory associated with the guest element. In this manner, the delivery of data from a source to where a guest element, such as a virtualized data-intensive distributed application, is accelerated.

In at least one implementation, upon being notified of a guest read process initiated by a guest element running in a virtual machine to read data into a location in guest memory associated with the guest element, a computing system identifies a location in host memory associated with the location in the guest memory and initiates a host read process to read the data into the location in the host memory that corresponds to the location in the guest memory.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates an operational scenario in an implementation.

TECHNICAL DISCLOSURE

Figure 1:
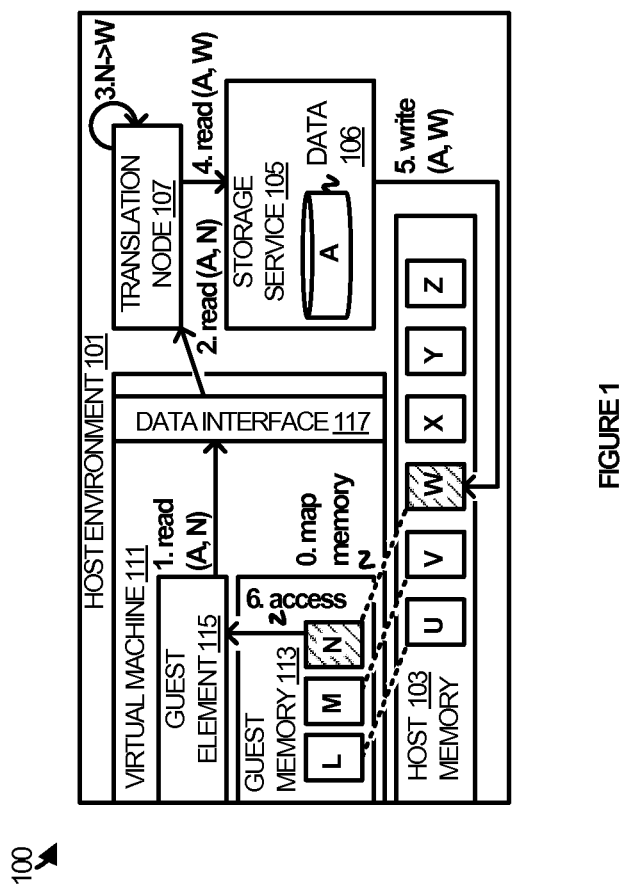
FIG. 1 illustrates an operational scenario in an implementation.

Various implementations described herein provide for accelerated data operations in which data is provided for consumption to applications executing within virtual environments in a manner that enables big data jobs and other resource intensive tasks to be virtualized. In particular, data that resides externally with respect to a virtual environment can be read by guest elements executing within the virtual environment at a pace sufficient to allow for very data intensive jobs. This is accomplished by enhancing the read process such that data read from a source is written in host memory that is associated with guest memory allocated to the guest elements.

In at least one implementation, a virtual machine is instantiated within a host environment. The virtual machine may be instantiated by a hypervisor running in the host environment. The hypervisor may run with or without an operating system beneath it. For example, in some implementations the hypervisor may be implemented at a layer above the host operating system, while in other implementations the hypervisor may be integrated with the operating system. Other hypervisor configurations are possible and may be considered within the scope of the present disclosure.

The virtual machine may include various guest elements, such as a guest operating system and its components, guest applications, and the like, that consume and execute on data. The virtual machine may also include virtual representations of various computing components, such as guest memory, a guest storage system, and a guest processor.

In operation, a guest element running in the virtual machine is allocated a portion of the guest memory available in the virtual machine. In normal operation, a guest element would initiate a read process to read data from a guest storage system in the virtual machine. The data would be read from the guest storage system and written to the portion of the guest memory allocated to the guest element.

It may be appreciated that when data is read or written in the virtual machine, a non-virtual representation of the data is being manipulated through the hypervisor in host memory or in a host storage system. One key task of the hypervisor in normal operation is to manage the reading and writing of data to and from host resources such that operations taken within the virtual machine are reflected in the host resources. Accordingly, when a region in guest memory is allocated to a guest element, a corresponding region in host memory, by implication, is effectively allocated to the guest element. This is because host resources such as memory or disk space are typically divided and allocated on a per-machine basis to each of multiple virtual machines running on the host. This is in accordance with the principal of isolation that allows each individual virtual machine to run in isolation from any others.

However, other applications, code, or components may also run on the host, in addition to any virtual machines that may be instantiated. These host elements are also isolated from the virtual machines. For example, a region in host memory that is allocated to a host element does not typically overlap with include a region in host memory that is, by implication, allocated to a guest element.

In the past, in order to feed data to big-data applications executing in a virtual machine, data would first have to be read from a source and written to a region in host memory from which it could be transferred into the virtual machine. The data would then be transferred into the virtual machine and written to a region in guest memory associated with the consuming application. The multiple steps taken to get data to the executing applications made running data intensive tasks problematic with respect to virtual environments.

In an enhancement, a more direct route for the data is proposed that avoids at least some of the various aforementioned steps in the data transfer process. Rather than reading data into a region in host memory and then having to transfer the data into the virtual machine, data can be read directly to a region in host memory that is mapped to a region in guest memory associated with a consuming application or element. In this manner, data transfer steps are eliminated that previously made running big data applications on virtual machines an impractical proposition.

In various scenarios, a specialized input/out driver is employed in the virtual machine with which a guest application or other element communicates to access files or other data on storage sub-systems. The input/output driver provides an abstracted view of a more complex storage service or infrastructure to the guest application that allows the guest application to initiate reads and writes without modification to any of its characteristics.

The input/output driver may appear to the guest application as any type of guest storage sub-system, such as a disk drive, solid state drive, network attached storage, or other suitable storage. In actuality, the input/output driver communicates with a translation module running in the host environment to carry out the reads or writes initiated by the guest application. The translation module communicates with another host element or service capable of reading data from a source and writing the data to an appropriate host memory location that is mapped to an appropriate guest memory location.

In a brief operational scenario, a memory mapping process is carried out to map regions in host memory to regions in guest memory allocated to a guest application. Once the mapping is accomplished, the translation module can translate the guest memory location identified in read or write requests (predominantly read requests) to an associated host memory location. Thus, data can be made accessible for consumption by the guest application simply by reading it from its source into a host memory location. Because the host memory location is mapped to the guest memory location, the guest application is able to access and process the data without any further reads or writes of the data. In some implementations, the region in host memory may be a region allocated to the translation node and its processes, although the region may be allocated to other elements or processes.

FIG. 1 illustrates one representative operational scenario 100 in which enhanced data operations are accomplished in accordance with at least some of the principals and ideas discussed above. In operational scenario 100, a host environment 101 is illustrated in which a virtual machine 111 may be implemented. Host environment 101 includes host memory 103, storage service 105, and translation node 107. It may be appreciated that host environment 101 may include other elements not shown for purposes of clarity. Host environment 101 may be implemented on any suitable computing system or systems.

Virtual machine 111 includes guest memory 113, guest element 115, and data interface 117. Virtual machine 111 may include other elements not illustrated for purposes of clarity. It may also be appreciated that one or more additional virtual machines may be instantiated and running within host environment 101, in addition to virtual machine 111.

In operational scenario 100, a memory mapping process is carried out to map guest memory 113 to host memory 103 (step 0). In this example, guest memory 113 includes various blocks L, M, and N, which are representative of different regions, locations, or other sub-divisions of guest memory 113. Host memory 103 includes blocks U, V, W, X, Y, and Z, which are representative of different regions, locations, or other sub-divisions of host memory 103. In this scenario, block L is mapped to block U, block M is mapped to block V, and block N is mapped to block W.

Once guest memory 113 is mapped to host memory 103, enhanced data operations can commence to enable guest element 115 to consume data at a pace sufficient for data-intensive application purposes. Continuing with operational scenario 100, guest element 113 communicates with data interface 117 to initiate a read process (step 1). As part of the read process, guest element 113 indicates to data interface 117 what data it is attempting to read, which in this scenario is represented by a portion A of data 106. The portion A of data 106 being read may be a file, a portion of a file, or any other type of data or sub-division of data 106. Guest element 113 also indicates to data interface 117 wherein guest memory the requested data should be deposited. In this scenario, block N is identified for the read process. It may be appreciated that some other element other than guest element 113 may determine and identify the location in guest memory 113 into which the portion A of data 106 may be read.

Data interface 117 responsively communicates directly or indirectly with translation node 107 to notify translation node 107 of the read request (step 2). In at least one implementation, a request queue is maintained by data interface 117 and shared with translation node 107 that details various read requests initiated by guest element 115 or any other element. Translation node 107 may monitor the request queue and handle read requests as they occur. Other mechanisms are possible, such as direct calls between data interface 117 and translation node 107. In some implementations, a complete queue is also maintained onto which translation node 107 records which read requests have been completed.

Having been notified of the read request, translation node 107 proceeds to translate the location in guest memory 113 identified by the read process to its corresponding location in host memory 103 (step 3). In this scenario, block W is associated with block N. Translation node 107 then advances the read process by communicating the subject of the read process and its destination to storage service 105 (step 4).

Storage service 105 may be any service capable of handling read or write processes with respect to data 106. Storage service 105 may be implemented by a host storage system with respect to a local storage device, such as a hard disk drive, solid state drive, or any attached storage. In addition, storage service 105 may be implemented by any other element or collection of elements in host environment 101 that may facilitate interaction with other storage elements, such as a network attached storage element or other remote storage facility.

Storage service 105 obtains the portion A of data 106 implicated by the read process, whether by reading from a disk drive or other local storage device or possibly communicating with remote elements, and writes the portion A of data 106 to block W in host memory (step 5). Accordingly, because block W is mapped to block N in guest memory 113, guest element 115 is able to access the portion A of data 106 without any other transfer operations needing to occur between host environment 101 and virtual machine 111.

In at least one implementation, guest memory is mapped into a cnode process space. A "cnode" as used herein refers to any application program or module suitable for implementing a translation node, such as translation node 107. A kernel driver in a host environment performs this mapping. The kernel driver is given the PID (process ID) of a qemu process (hypervisor process) which is spawned in a virtual machine. Using the PID, the kernel driver interrogates the kernel's internal data structure for the qemu process searching all of its memory allocation.

Next, the kernel driver determines which allocation represents the virtual machine's memory. The kernel driver pauses the qemu process while this memory allocation is mapped into the cnode space. This mapping technique is similar to how a regular driver will map user space memory for a direct memory access (DMA) (bus master) I/O operation. In some implementations, memory may be considered double-mapped. Copies of the page tables for the mapping from the qemu process can be made and applied to the cnode process.

The mapping may occur in two stages. In a first stage, the PID is passed to the kernel driver via an input/output control (IOCTL) call. The driver looks up the process in the kernel's internal data structure, finds the correct memory allocation and saves off this information in its own data structure. It returns an offset to the caller and a status of success. The caller (cnode) will then use this offset to invoke a standard UNIX (or Linux) mmap system call. The kernel driver supports the mmap operation. The operating system will call the kernal driver's mmap entry points to do the actual mapping. Using the offset passed in, it (the mmap portion of the kernel driver) will look in its internal data structure to find the information that it saved off from the IOCTL call. It will then pause the qemu process, copy its user's pages for the memory allocation and use them to lock down the pages and create a mapping to the cnode process.

It may be appreciated that mapping guest memory into host memory is an enhancement that enables accelerated data input and output as discussed herein. In some implications, this is accomplished by modifying the kernel API for locking a region into memory for a DMA I/O operation. The API in some cases may be intended for use with a PCI device to be able to perform bus mastering PO operations. Instead, here the API is used for locking the memory down. Linux kernel structures are accessed directly in order to get the required page tables for performing the mmap operation. The mmap operation is otherwise intended or a proprietary PCI device to be able to map its memory into a user process space.

Figure 2A:
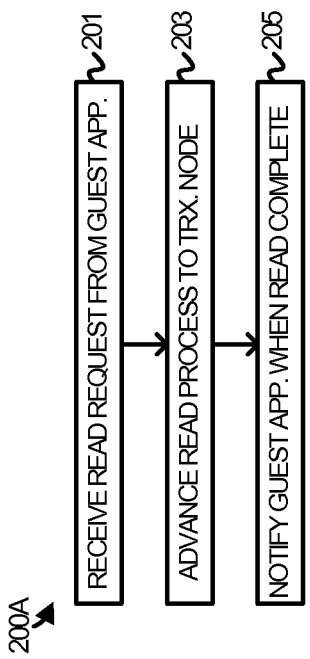
FIG. 2A illustrates a method in an implementation.

FIG. 2A illustrates a process 200A that may be carried out by data interface 117 or any other suitable input/output drive. In operation, data interface 117 receives a read request from a guest application (step 201). The read request identifies target data for consumption by the guest application and a location(s) in guest memory into which to read the target data. Data interface 117 advances the read process by communicating the read request to translation node 107 or some other suitable host element (203). This may be accomplished by, for example, maintaining a shared queue of pending and completed read requests. Upon being notified that a read process has been completed, data interface 117 informs the guest application of the same so that the guest application can access the data (step 205) in its location in guest memory.

Figure 2B:
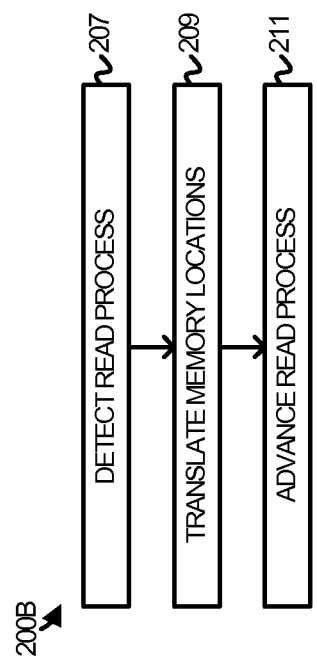
FIG. 2B illustrates a method in an implementation.

FIG. 2B illustrates a process 200B that may be carried out by translation node 107 or any other suitable host element. In operation, translation node 107 detects that a read process has been initiated (step 207). In response, translation node 107 translates the location in the guest memory implicated by the read process into a corresponding location in host memory (step 209). With this new memory location, translation node 107 advances the read process (step 211). For example, translation node 107 may communicate with a storage sub-system or service such that the target data can be read from a source and written to the location host memory mapped to the designated location in guest memory.

Figure 3:
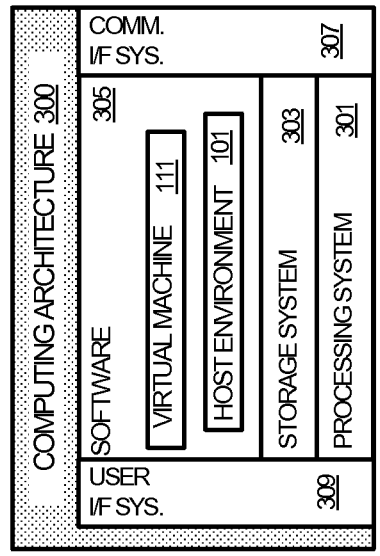
FIG. 3 illustrates a computing architecture in an implementation.

Referring now to FIG. 3, computing architecture 300 is representative of an architecture that may be employed in any computing apparatus, system, or device, or collections thereof, to suitably implement all or portions of host environment 101 and virtual machine 111, as well as process 200A and 200B illustrated in FIG. 2, or variations thereof. Host environment 101, virtual machine 111, process 200A, and process 200B may be implemented on a single apparatus, system, or device or may be implemented in a distributed manner. Process 200A and 200B may be integrated with the host environment 101 or virtual machine 111, but may also stand alone or be embodied in some other application.

Computing architecture 300 may be employed in, for example, server computers, cloud computing platforms, data centers, any physical or virtual computing machine, and any variation or combination thereof. In addition, computing architecture 300 may be employed in desktop computers, laptop computers, or the like.

Computing architecture 300 includes processing system 301, storage system 303, software 305, communication interface system 307, and user interface system 309. Processing system 301 is operatively coupled with storage system 303, communication interface system 307, and user interface system 309. Processing system 301 loads and executes software 305 from storage system 303. When executed by processing system 301, software 305 directs processing system 301 to operate as described in operational scenario 100 with respect to host environment 101 and virtual machine 111 and their elements. Computing architecture 300 may optionally include additional devices, features, or functionality not discussed here for purposes of brevity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations, or variation.

Storage system 303 may comprise any computer readable storage media readable by processing system 301 and capable of storing software 305. Storage system 303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 303 may also include communication media over which software 305 may be communicated internally or externally. Storage system 303 may be implemented as a single storage device but may also be implemented across multiple storage devices or sub-systems co-located or distributed relative to each other. Storage system 303 may comprise additional elements, such as a controller, capable of communicating with processing system 301 or possibly other systems.

Software 305 may be implemented in program instructions and among other functions may, when executed by processing system 301, direct processing system 301 to operate as described herein by operational scenario 100 with respect to host environment 101 and virtual machine 111, as well as by process 200A and process 200B. In particular, the program instructions may include various components or modules that cooperate or otherwise interact to carry out operational scenario 100, process 200A, and process 200B. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. Software 305 may include additional processes, programs, or components, such as operating system software, hypervisor software, or other application software. Software 305 may also comprise firmware or some other form of machine-readable processing instructions executable by processing system 301.

In general, software 305 may, when loaded into processing system 301 and executed, transform a suitable apparatus, system, or device employing computing architecture 300 overall from a general-purpose computing system into a special-purpose computing system customized to facilitate accelerated data input and output with respect to virtualized environments. Indeed, encoding software 305 on storage system 303 may transform the physical structure of storage system 303. The specific transformation of the physical structure may depend on various factors in different implementations of this description. Examples of such factors may include, but are not limited to, the technology used to implement the storage media of storage system 303 and whether the computer-storage media are characterized as primary or secondary storage, as well as other factors.

For example, if the computer-storage media are implemented as semiconductor-based memory, software 305 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing architecture 300 is generally intended to represent an architecture on which software 305 may be deployed and executed in order to implement operational scenario 100 (or variations thereof). However, computing architecture 300 may also be suitable for any computing system on which software 305 may be staged and from where software 305 may be distributed, transported, downloaded, or otherwise provided to yet another computing system for deployment and execution, or yet additional distribution.

Communication interface system 307 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 309, which is optional, may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 309. In some cases, the input and output devices may be combined in a single device, such as a display capable of displaying images and receiving touch gestures. The aforementioned user input and output devices are well known in the art and need not be discussed at length here. User interface system 309 may also include associated user interface software executable by processing system 301 in support of the various user input and output devices discussed above. Separately or in conjunction with each other and other hardware and software elements, the user interface software and devices may support a graphical user interface, a natural user interface, or any other suitable type of user interface.

FIG. 4 illustrates memory mapping operational scenario 400 in which a portion of physical host memory is mapped to virtual memory. In operational scenario 400, at least a portion of addressable memory space for host memory 401 is illustrated. For simplicity, positions in host memory are addressable using 16-bit values represented in operational scenario 400 by hexadecimal numbers ranging from 0000-FFFF with each hex value in the range addressing a position in memory. In practice, however, host memory 401 will likely include many more positions than can be accessed by 16-bit values and, therefore, may include many more memory addresses that are addressable with values larger than 16-bit (e.g. 32 or 64-bit values).

In operational scenario 400, a guest element requires guest memory 402 to operate. The guest element may be the operating system of a virtual machine or may be a process running within a virtual machine. That is, guest memory 402 may be the entire amount of physical host memory allotted to a virtual machine or may be an amount of virtual memory allotted to a process running on the virtual machine, which is less than the total amount of host memory allotted to the virtual machine. In this example, the guest element is allocated 20,480 guest memory positions illustrated by guest memory 402 as positions 0000-4FFF. Since the guest element accesses guest memory 402 as though guest memory 402 is physical memory, the guest element will use addresses 0000-4FFF rather than their corresponding addresses in host memory 401. These guest memory positions are mapped, on a one-to-one basis, to their corresponding positions in host memory 401 (step 0).

It should be understood that, while guest memory 402's position within host memory 401 comprises a single block of sequential addresses, guest memory 402 might comprise multiple non-contiguous address blocks. Similarly, guest memory 402 does not necessarily translate to a single contiguous block of addresses in host memory 402 but instead may be separated into multiple address blocks within host memory 401.

After mapping, the guest process requests a read of data from a storage service into the memory position addressed by 1400 (step 1). In other words, the guest process is going to use the requested data for some purpose and, therefore, requests that the data be put into guest memory for access. As that read request is passed to the physical host machine, location 1400 within virtual memory 402 is translated to its corresponding location in host memory 401, which will actually store the data requested by the guest element (step 2). In this example, since guest memory 402 takes up a corresponding block of host memory 401, guest memory location 1400 is simply 1400 locations offset from location 6000 in host memory 401. Thus, guest memory location 1400 corresponds to host memory location 7400.

Once host memory location 7400 is determined, the requested data is retrieved from the storage service and is written to host memory location 7400 (step 3). As noted above, the data may take up more than one location indexed from location 7400. After the data has been written to location 7400, the guest element can then access the data by reading the data out of location 1400 of guest memory 402 (step 4). Since location 1400 corresponds to, and is essentially just an alternative address for, location 7400 in host memory 401, the guest element's access of location 1400 simply accesses the data in location 7400 of host memory 401. Accordingly, during operation 400, the data requested by the guest element is read directly into the memory location of host memory 401 from which the data will be accessed by the guest element.

It should be understood that an operation similar to operation 400 might also be used when the guest element requests to write data to a storage service. For example, the guest element requests that the data in location 1400 of guest memory 402 be written to the storage service. Location 1400 is translated to location 7400 of host memory 401 and the data in location 7400 is transferred to the storage service.

It should be further understood that, while the above operation refers to data read only into a single location (i.e. 1400 of guest memory 402), the same principles apply to data read into multiple locations. That is, the requested data may include more information than can be stored in a single memory location and, therefore, needs to be spread across multiple locations. These multiple locations, whether or not they are contiguous locations within guest memory 402 or host memory 401, are mapped between guest memory 402 and host memory 401 just as the single location 1400 was above.

Figure 5:
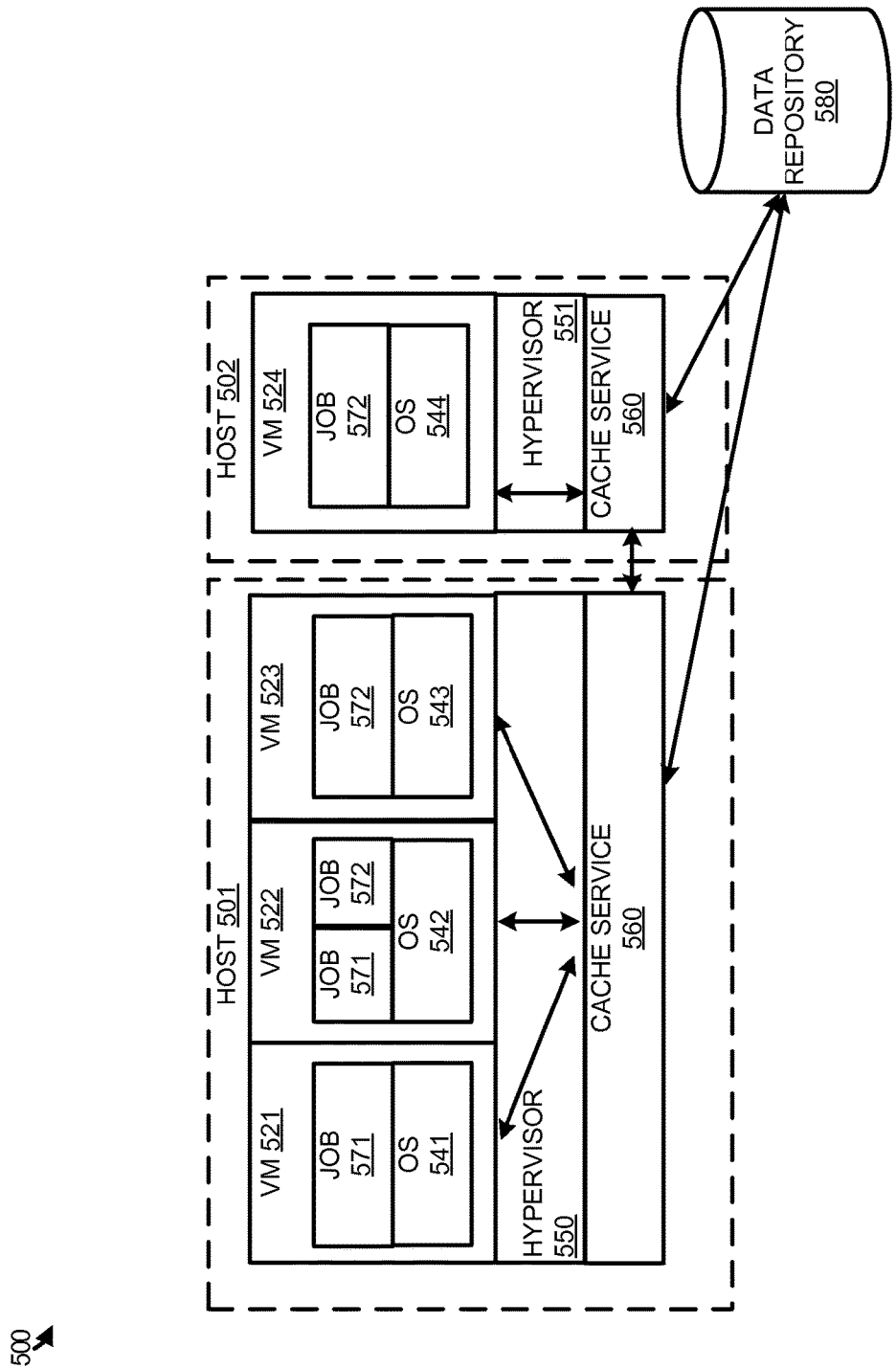
FIG. 5 illustrates a server system.

FIG. 5 illustrates a server system 500 that operates in accordance with the embodiments described above. System 500 includes physical host computing systems 501 and 502 each comprising a host physical memory akin to host memory 401 of FIG. 4. Executing on one or more processors within host computing system 501 are cache service 560 and hypervisor 550. Executing on one or more processors within host computing system 502 are cache service 560 and hypervisor 551.

Hypervisors 550 and 551 are used to instantiate virtual machines 521-524, as illustrated. Virtual machines (VMs) 521-524 are used to process large amounts of data and may include various guest elements, such as guest operating systems 541-544 and their components, guest applications, and the like. The virtual machines may also include virtual representations of computing components, such as guest memory (e.g. guest memory 402 from FIG. 4), a guest storage system, and a guest processor.

In this example, Job 571 is executing on VM 521 and VM 522, which is also executing Job 572. Job 572 is further executing on VMs 523 and 524. Each of jobs 571 and 572 process data retrieved from data repository 580, which may be a storage service accessible by both host 501 and host 502 over a communication network, such as a local area network (LAN), or at least a portion of data repository 580 may be included in at least one of hosts 501 and 502. Cache service 560 communicates with data repository 580 to facilitate the supply of data to each VM 521-524 though hypervisors 550 and 551. Since multiple virtual machines are running each of jobs 571 and 572, cache service 560 coordinates the use of data and host memory used by each instance. The coordination may depend upon a variety of factors including quality of service for each job, amount of host memory available for each job, priority of each job, and the like.

Using the operations described above, each job executing on VMs 521-523 is allocated a region of the guest memory allocated to each of VMs 521-523. Similarly, job 572 is allocated a region of the guest memory allocated to VM 524. These regions of virtual memory are mapped to their corresponding regions within the memory of hosts 501 and 502, respectively. According, when a job requests that data be read into locations within its allocated region of guest memory from data repository 580, the locations of guest memory are translated to corresponding host locations and cache service 560 reads the requested data from data repository 580 into the corresponding host locations. The translation step may occur at any software level represented within hosts 501 and 502 provided that the information necessary to map guest and host memory regions can be obtained at that level. Thus, the translations may occur at the cache service, within the hypervisor, within the VMs, or in some other software element executing in the stack.

Once the read process is complete, the requesting job can access the data from the guest locations designated in the request. Advantageously, to increase efficiency of performing a job, the memory mapping from the example above allows instances of the job to be spread across multiple VMs, both on a single host system and across multiple host systems, while maintaining a data access speed nearing what would be achieved if the job instances were each running natively on a host system. Without such memory mapping, the requested data would first be stored in a non-corresponding location within host memory and then moved to the location corresponding to the guest memory used by the requesting job. This extra move step takes time, which really adds up when processing large data sets.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus comprising:
   one or more computer readable storage media;
   program instructions stored on the one or more computer readable media that, when executed by a processing system to facilitate accelerated input and output with respect to a virtual environment, direct the processing system to at least:
   upon being notified of a guest read process initiated by a first processing job running in a first virtual machine on a host system to read data into a location in guest memory associated with the first processing job, identify a location in host memory associated with the location in the guest memory, wherein the first processing job is also running in a second virtual machine on the host system;
   coordinate an amount of host memory used by the first processing job across the first virtual machine and the second virtual machine; and
   initiate a host read process to read the data into the location in the host memory that corresponds to the location in the guest memory.

2. The apparatus of claim 1 further comprising the processing system executing the program instructions.

3. The apparatus of claim 1, wherein the program instructions further direct the processing system to:
   map a region of the guest memory, including the location in the guest memory, to a region in the host memory, including the location in the host memory.

4. The apparatus of claim 3, wherein to direct the processing system to map the region of the guest memory to the region in the host memory, the program instructions direct the processing system to:
   determine a range of guest memory addresses within the guest memory for use by the first processing job;
   determine a range of host memory addresses within the host memory corresponding to the range of guest memory addresses, wherein each guest memory address in the range of guest memory addresses maps to a respective host memory address in the range of host memory addresses.

5. The apparatus of claim 1, wherein the program instructions further direct the processing system to:
   upon completion of the host read process, notify the first processing job that the guest read process has completed.

6. The apparatus of claim 1, wherein the host read process reads the data from a storage service and writes the data to the location in the host memory.

7. A method for facilitating accelerated input and output with respect to a virtual environment comprising:
   upon being notified of a guest read process initiated by a first processing job running in a first virtual machine on a host system to read data into a location in guest memory associated with the first processing job, identifying a location in host memory associated with the location in the guest memory, wherein the first processing job is also running in a second virtual machine on the host system;
   coordinating an amount of host memory used by the first processing job across the first virtual machine and the second virtual machine; and
   initiating a host read process to read the data into the location in the host memory that corresponds to the location in the guest memory.

8. The method of claim 7, further comprising:
   mapping a region of the guest memory, including the location in the guest memory, to a region in the host memory, including the location in the host memory.

9. The method of claim 8, wherein mapping the region of the guest memory to the region in the host memory comprises:
   determining a range of guest memory addresses within the guest memory for use by the first processing job;
   determining a range of host memory addresses within the host memory corresponding to the range of guest memory addresses, wherein each guest memory address in the range of guest memory addresses maps to a respective host memory address in the range of host memory addresses.

10. The method of claim 7, further comprising:
    upon completion of the host read process, notifying the first processing job that the guest read process has completed.

11. The method of claim 7, wherein the host read process reads the data from a storage service and writes the data to the location in the host memory.

* * * * *